A. URBACH.
AUTOMOBILE FENDER.
APPLICATION FILED DEC. 12, 1912. RENEWED DEC. 12, 1914.
1,124,978.
Patented Jan. 12, 1915.
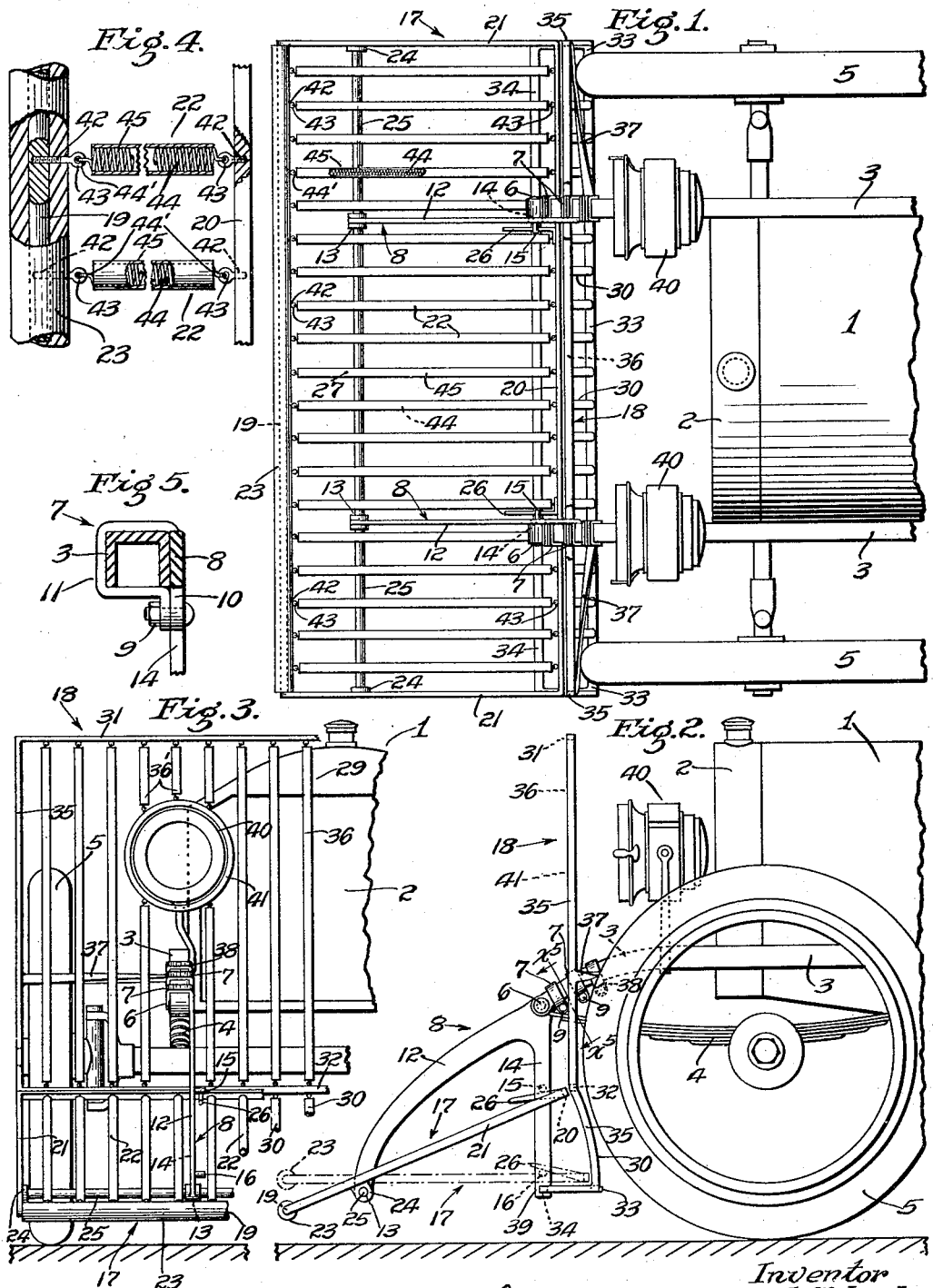
Inventor
Alfred Urbach
by James R. Townsend
his atty.

UNITED STATES PATENT OFFICE.

ALFRED URBACH, OF LOS ANGELES, CALIFORNIA.

AUTOMOBILE-FENDER.

1,124,978. Specification of Letters Patent. Patented Jan. 12, 1915.

Application filed December 12, 1912, Serial No. 736,428. Renewed December 12, 1914. Serial No. 876,991.

*To all whom it may concern:*

Be it known that I, ALFRED URBACH, a citizen of the United States, residing at Los Angeles, in the county of Los Angeles and State of California, have invented a new and useful Automobile-Fender, of which the following is a specification.

My invention relates to novel means which may be attached to an automobile or other vehicle for the purpose of preventing accident and danger to human or other forms of life.

An object of my invention is to provide a durable fender which may be attached to any automobile, and which is both gainly in appearance, and efficient and effective in preventing danger to life or limb.

Another object is to minimize the space required by the fender ahead of the automobile.

Another object is to provide a novel fender bar which is notably resilient in its action, so that the shock is minimized when a person falls onto the same; and which is substantially water proof and rust proof, so that it may withstand continued washing of the automobile without deterioration.

Other objects may appear in consideration of the detailed description and by inspection of the drawings.

The accompanying drawings illustrate the invention.

Figure 1 is a plan view showing the forward portion of an automobile with the fender attached to same. Fig. 2 is a side elevation of the automobile portion and the fender shown in Fig. 1. Fig. 3 is a fragmental front view of the automobile and fender, the left half only being shown. Fig. 4 is a fragmental sectional view of a portion of the forward rubber bumper showing the details of a novel fender bar embraced in my invention. Fig. 5 is a fragmental sectional view of one of the side members of the supporting frame taken on the line $x^5$—$x^5$ of Fig. 2, and shows the leaves of the clamp, whereby the fender bracket is bound to the frame.

The portion of the automobile shown in the figures includes the usual hood 1, the radiator 2, the heavy side members 3 of the supporting frame, supporting springs 4 and the forward wheels 5. The frame members 3 are usually connected to springs 4 by means of a pin 6, Fig. 2, and by means of suitable clamps 7 adapted to embrace the frame members 3 behind the pin 6. The two fender brackets 8 are rigidly and securely attached to the automobile frame. The clamps 7 are formed integrally with the brackets 8, and clamping nuts 9 are provided whereby the two leaves or straps 10 and 11, projecting out from the bracket metal, see Fig. 5, may be securely bound around the frame member 3. However, each of the brackets 8 proper really comprises the forward supporting arm 12, having at its lower extremity a bearing aperture 13 in which the fender is pivotally supported, and the brackets also include a second arm 14 carrying the pins 15 and 16, which pins comprise means for limiting the pivotal motion of one of the fender parts as will be hereinafter described.

The fender itself comprises two parts, the fender part 17 being pivotally mounted on the fender brackets 8, and the fender part 18 being stationarily mounted and extending vertically, or substantially vertically, behind the fender part 17. The fender part 17 comprises a rectangular frame formed by the rigid forward and rearward members 19 and 20, respectively, and by the side members 21, all of which are firmly attached to each other in any suitable manner. Between the forward and rear members 19 and 20 are attached resilient fender bars 22, the details of which will be hereinafter described. A soft rubber bumper 23 is provided on the forward member 19 in such manner as to relieve the shock somewhat when a person is picked up by the fender. Lugs 24 depend from each of the side bars 21, and between said lugs is carried the fender supporting shaft 25, the same passing loosely through apertures 13 of the fender brackets 8, and thereby pivotally connecting the fender part 17 to the automobile. The lugs 24, through which the shaft 25 passes, extending below the side bars 21, will permit the center of gravity of the fender to shift rearward when the fender is raised to horizontal position, thereby operating to facilitate maintaining said fender in horizontal position when a person has fallen on the same. Arms 14 of brackets 8 extend downward between the fender bars 22, and for the purpose of coöperating with pins 15 and 16 to limit the pivotal motion of fender part 17, the two fingers 26, Fig. 1, are rigidly attached to the rear frame member 20 and move between the limiting pins 15 and 16.

In view of the weight of the bumper 23 the center of gravity of the fender part 17 is carried ahead of the geometrical center of said fender part to a point located approximately at 27, Fig. 1, and it will be noticed that the position of the fender supporting shaft 25 is located slightly behind the center of gravity 27. With this construction the fender part 17 will be normally inclined rearwardly and upwardly, as in Fig. 2, but when a person is picked up by the fender, he will usually fall onto the more extensive rear fender portion located behind the supporting shaft 25, so that his weight will shift the center of gravity behind said shaft and pivotally rotate the fender part 17 into a horizontal position indicated by the dotted position, Fig. 2. By thus pivotally mounting this fender part, so that same is normally inclined as aforesaid, the bumper will run close to the ground and will trip a person without breaking the lower limbs; and after the person has dropped onto the fender, the same will turn into the horizontal position, so that the person cannot roll forward and off same. Furthermore, the inclined position of said fender permits the same to occupy as little horizontal space as possible.

In order to prevent a person rolling off the rear of the fender portion 17 and dropping beneath the body of the car, the second portion 18 is provided behind same. The fender portion 18 comprises a vertical, or substantially vertical, upper portion 29 extending slightly above the top of the radiator 2, and includes a lower concaved portion 30 in which the rear frame member 20 of the fender part 17 is adapted to pivotally operate. The frame of the fender portion 18 comprises the rigid cross members 31, 32, 33 and 34, Figs. 1 and 2, the side members 35, all being suitably bound to each other so as to give rigidity to the frame. The lower portion of the side members 35 are bent so as to form the concaved portion 30, and are then bent horizontally forward and carry the cross member 34 at their forward extremities. Between the cross members 31 and 32, and the cross members 32 and 33, are attached resilient fender bars 36 similar to the bars 22 of fender part 17. For the purpose of providing suitable supporting means for the fender part 18, two members 37 are rigidly attached to and extend inwardly from the side members 35; and said members 37 are each provided with a clamp 38 similar to clamp 7, Fig. 5, said clamps 38 being adapted to embrace and rigidly support the fender part 18 upon the main frame members 3 of the automobile. To reinforce these supporting means for the fender member 18, the cross bar 34 passes through an aperture 39, Fig. 2, provided in the depending bracket arm 14.

Usually the automobile is provided with lamps 40, and the vertical portion 29 of the fender part 18 is provided with two circular hoops 41 immediately before the lamps, the same presenting suitable apertures through which the light of the lamps may shine without any interruption whatsoever. It will be seen, Fig. 3, that the particular fender bars 36', which normally would pass before the lamp face so as to cast a shadow ahead, are cut away and the free extremity attached to hoops 41, so that the apertures inclosed by said hoops are altogether open. The details of the fender bars 22 and 36 with which my appliance is provided are shown in Fig. 4. Screw-fastenings 42 having eyes 43 pass through the bumper member 23 and are rigidly attached into the frame member 19, and similar screw-fastenings are rigidly attached into the rear frame member 20 of the fender part 17. Between the eyes 43 of corresponding fastenings 42 is stretched the resilient helical spring 44 having looped ends 44' for attaching the same to the eyes 43, and a light rubber tubing 45, of any suitable color, passes over said spring. The construction and mode of fastening the fender bars 36 is identical with that of the bars 22 and need not be separately described.

Fender bars, as above constructed, may be readily removed by merely springing the extremities of the springs 44 from the fastening eyes 43; and are so highly resilient that a person is caught softly and easily on the same. Furthermore, by incasing the springs 44 in a rubber tube 45, the rough, wiry contour of the same is avoided, and at the same time the springs 44 are protected from the water wherewith the automobile is washed, so that said springs will not be subject to rust or other deteriorating agent.

The operation and mode of construction of my automobile fender will be clear from the foregoing detailed description, but it is understood, however, that I do not contemplate limiting myself to the specific form shown and described.

I claim:

1. In combination, an automobile having a frame, brackets attached to the front portion of said frame and extending forward from the automobile, said brackets each having a forwardly projecting arm and a depending arm behind said forwardly projecting arm, said depending arms having pins, and a fender comprising two parts, one of said parts being pivotally mounted on the forwardly projecting supporting arms of the brackets, said pivotally mounted fender part having fingers adapted to coöperate with said pins on the depending arms of said bracket so as to limit the pivotal swing of said pivotally mounted fender part; the other of said fender parts being stationarily supported in a vertical position and behind the first said fender part, the lower portion of said second fender part being curved so as to permit the rear portion of said pivotally mounted fender part to swing freely past the same and so as to prevent a person who has dropped onto said pivotally mounted fender part from falling off the rear portion of same.

2. The combination with the frame of a motor car, of brackets attached to said frame, said brackets being provided with front and rear arms, a fender part pivoted between its front and back edges and back of its center of gravity to said front arms, stops on the rear arms to engage the fender part when said fender part is inclined upward and backward, and other stops on the rear arms to engage the fender part when said fender part is substantially horizontal.

3. The combination with the motor car, of brackets attached to the front of said motor car, a fender pivoted to said brackets, said fender having a front bar of sufficient weight normally to retain the fender in a position inclined forwardly, said brackets having vertical members positioned at the rear of said fender, and hook members secured to the rear of said fender adapted to normally engage said vertical members whereby to limit the forward tilting movement of said fender.

In testimony whereof, I have hereunto set my hand at Los Angeles, California, this 6th day of December, 1912.

ALFRED URBACH.

In presence of—
JAMES R. TOWNSEND.
ROBERT A. STEPS.

Copies of this patent may be obtained for five cents each, by addressing the "Commissioner of Patents, Washington, D. C."